Patented July 28, 1953

2,647,097

UNITED STATES PATENT OFFICE 2,647,097

PLASTIC MOLDING COMPOSITIONS COMPRISING A VINYL CHLORIDE POLYMER AND A RESINOUS TERPENE-PHENOL REACTION PRODUCT

George P. Humfeld and Donald Augustus de Tartas, Indianapolis, Ind., assignors to Radio Corporation of America, a corporation of Delaware No Drawing. Application July 20, 1951, Serial No. 237,832

7 Claims. (Cl. 260—28.5)

The present invention relates to improved synthetic resin molding compositions and, more particularly, to improved compositions especially suitable for molding phonograph records. The invention also relates to phonograph records made of the improved compositions.

In general, there are two distinct types of phonograph record molding compositions. One of these is the substantially unfilled type having no mineral fillers. This type of composition produces a record which is almost unbreakable and, if the resins are properly chosen, wear resistance of the record is high and surface noise is low. However, some compositions comprising nearly 100% resin, such as vinyl chloride-acetate copolymers, are relatively difficult to mold. Slight changes in processing of the compositions or in the molding parameters cause the appearance of flaws in the molded products.

The other main type of composition for molding phonograph records is the filled type. This type includes relatively high percentages of fillers such as various mineral or organic materials. Fillers cost much less per pound than synthetic resins. Consequently, a cost advantage is derived by using as high a percentage as possible of fillers, in the resin compositions.

Although highly filled resin compositions cost less than unfilled compositions, they usually produce phonograph records which have very low flexural strength, low flexibility, (angle of deflection) poor wear and high surface noise. It would, therefore, be desirable to have a filled molding composition with all of the cost advantage usually intrinsic in this type of composition and, at the same time, one from which records of satisfactory strength, wearing qualities, and playing qualities could be manufactured. The compositions of the present invention are of the filled type. However, records can be molded from these compositions which have improved flexural strength, wear resistance, and warpage resistance compared with records made from most previously known conventional molding compositions of the same general type.

One object of the present invention is to provide improved resinous molding compositions containing relatively high proportions of filler.

Another object of the present invention is to provide improved low cost, synthetic resin molding compositions.

Another object of the invention is to provide improved phonograph record molding compositions containing relatively high percentages of fillers.

Another object of the invention is to provide improved phonograph records made of molding compositions having relatively high percentages of fillers.

Still another object of the invention is to provide phonograph records of improved flexural strength, flexibility, and wear resistance but containing relatively high percentages of fillers.

These and other objects will be more apparent and the scope of the invention, as well as specific embodiments thereof, will be more particularly pointed out in the detail description which follows.

In general, the present invention comprises molding compositions and phonograph records in which the essential resinous ingredients are 25 to 30% by weight of a vinyl resin from the class consisting of polyvinyl chloride, vinyl chloride-vinylidene chloride copolymers in which the vinylidene chloride varies from 5 to 15% by weight, and vinyl chloride-vinyl acetate copolymers in which the vinyl acetate varies from 6–15% by weight, and 5–10% by weight of a second resin which is a product produced by reacting a terpene and a phenol in the presence of a molecular compound of boron trifluoride, said second resin having a melting point of 93–95° C. The filler content of these compositions ranges from 50–60% by weight. The compositions may also contain minor amounts of waxes, vinyl resin stabilizers, plasticizers and coloring agents, or any one of them, particularly if used to make phonograph records.

A specific example of a composition used to make phonograph records in accordance with the present invention will now be given.

Example

| | Percent by weight |
|---|---|
| Copolymer of vinyl chloride-vinyl acetate containing 12–15% by weight vinyl acetate | 27.0 |
| Resin produced by reacting a terpene and a phenol in the presence of a molecular compound of boron trifluoride, melting point 93–95° C. (Newport V-40) | 6.0 |
| Wax (straight chain hydrocarbon wax having melting point of 102° C. and molecular weight of 20,000 having the trade name Estawax) | 1.0 |
| Stabilizer (dibasic lead stearate) | 1.0 |
| Carbon black | 1.5 |
| Plasticizer—Dutrex 20 | 4.0 |
| Mineral filler (calcium carbonate and red slate) | 59.5 |

As stated previously, in place of the vinyl resin mentioned in the example, copolymers of vinyl chloride-vinylidene chloride, or polyvinyl chloride may be used in amounts ranging from 25-30% by weight of the composition. The vinyl resin provides the qualities of wear, toughness, flexibility, and warpage resistance necessary in good phonograph records.

The terpene-phenol reaction product resin may be present within the range of about 5 to 10% by weight. The preparation of this resin is more particularly described in U. S. Patent 2,343,845. The combination of the specified percentages of vinyl resin and this reaction product resin is responsible for the improved properties of the molded articles of the present invention when comparing the articles with others containing equally high percentages of fillers. The reaction product resin also makes fusion of the compositions easier and causes the compositions to be more plastic at their softening point temperatures. This increases the ease of molding.

In good quality, filled composition type phonograph records, wax is desirable to impart satisfactory stylus wear resistance. Any hard natural or synthetic wax compatible with the other ingredients may be used. Examples of suitable natural waxes include carnauba and montan. Synthetic waxes, in addition to the one mentioned in the example, include microcrystalline hydrocarbon waxes having melting points of 83-85° C., and ceytl acetamide. Waxes are generally used within the range of 0.75-1.5% by weight in this type of composition.

Stabilizers are desirable to prevent decomposition of the vinyl resin during processing. They are preferably used within the range of about 0.5 to 2% by weight. If the percentage is too high, surface blooming is caused. Metallic salts of fatty acid esters are suitable, in general. A secondary function of this ingredient is that of a mold lubricant to facilitate removal of the molded product from the press.

Carbon black may be used in any amount up to 3% with the preferred range being 1-3% by weight. It is used as a coloring agent and may be replaced by other colorants such as dyes.

Plasticizers are desirable to increase flexibility of the product, to facilitate ease of molding, and to reduce molding cycle time. Aromatic type plasticizers such as ortho-nitro-biphenyl, may be used. Others are the ester type, such as dioctyl phthalate and dibutyl sebacate. Liquid petroleum hydrocarbon plasticizers are preferred. This type of plasticizer may be prepared as follows. An aromatic type crude petroleum is first subjected to fractional distillation to remove casing head gasoline and other light fractions. What is known as a "center cut" is then distilled off at about 210° F. This fraction has a viscosity of 60 Saybolt Universal seconds and is a lubricating oil cut. This lubricating oil cut is extracted with sulfur dioxide, removing a mixture of aromatic and paraffinic hydrocarbons. The extract comprises excellent plasticizers for synthetic resins. Included in the extract is Dutrex 20 having an initial boiling point of 360° F. at 1 mm. pressure and a minimum specific gravity of 1.025. In the compositions of the present invention, any of the general class of petroleum secondary plasticizers, made as above described, may be used, for example Dutrex 20. The amount of plasticizer may vary from about 0.75% to about 5% by weight and the preferred amount depends upon the particular one chosen.

Any of the conventional powdered mineral fillers may be used in percentages of from 50-60% by weight. It is preferred to use a mixture of about 7 parts calcium carbonate to 5 parts red slate, ground to a fineness such that 99.5% will pass through a 325 mesh standard screen. It is also possible to use either one of these two materials alone or in any ratio. In order to reduce the specific gravity of the product, small percentages of organic filler may be substituted for part of the mineral filler. Suitable organic fillers are walnut shell flour or a flour obtained as a by-product of sulfuric acid extraction of either oat hulls or corn cobs.

Disc phonograph records are made of the above compositions by blending the ingredients in a Banbury type mixer, sheeting on rollers, cutting the sheets into rectangular pieces called "biscuits" and molding under heat and pressure, for example 270° F. and 1600-1800 lbs./sq. in. pressure. Sound tracks can be molded into either one or both faces of the record.

Compared to records made of compositions which include about 98% copolymer of vinyl chloride-vinyl acetate, records made of the above described compositions of the present invention have somewhat inferior wearing qualities but can be pressed on a 35% shorter time cycle and have only half the materials cost. The average number of flaws appearing on the molded surfaces is also much lower using compositions of the present invention.

Compared to presently used ethyl cellulose record compositions from which brittle, highly filled records of conventional type are being made, the records of the present invention are about 20% stronger, have three times the flexibility, twice the stylus wear resistance, equal warpage resistance and equal plasticity at molding temperatures.

What we claim is:

1. A molding composition in which the resinous ingredients consist essentially, in respect to the total composition, of 25-30% by weight of a vinyl resin from the class consisting of polyvinyl chloride, vinyl chloride-vinylidene chloride copolymers in which the vinylidene chloride varies from 5-15% by weight, and vinyl chloride-vinyl acetate copolymers in which the vinyl acetate varies from 6-15% by weight, and 5-10% by weight of a second resin which is a product produced by reacting a terpene and a phenol in the presence of a molecular compound of boron trifluoride, said second resin having a melting point of 93-95° C., said composition also including 50-60% by weight filler and a minor amount of a wax, a vinyl resin stabilizer, a plasticizer, and a coloring agent.

2. A composition according to claim 1 in which said vinyl resin is said vinyl chloride-vinyl acetate copolymer.

3. A composition according to claim 2 including 0.5 to 2% by weight of said vinyl resin stabilizer.

4. A composition according to claim 3 in which said plasticizer is a mixture of petroleum hydrocarbons extracted with sulfur dioxide from the center cut fraction of aromatic type crude oil obtained by distillation at 210° F., said mixture having an initial boiling point of 360° F. at 1 mm. pressure.

5. A composition according to claim 4 including 1-3% by weight carbon black.

6. A composition according to claim 5 including 0.75-1.5% by weight of said wax.

7. A phonograph record having a sound track thereon and comprising in respect to total composition 25–30% by weight of a vinyl resin from the class consisting of polyvinyl chloride, vinyl chloride-vinylidene chloride copolymers containing 5–15% by weight of said vinylidene chloride, and vinyl chloride-vinyl acetate copolymers in which the vinyl acetate varies from 6–15% by weight, and 5–10% by weight of a second resin which is a product produced by reacting a terpene and a phenol in the presence of a molecular compound of boron trifluoride, said second resin having a melting point of 93–95° C., 50–60% by weight filler, and minor amounts of a wax, a vinyl resin stabilizer, a plasticizer, and a coloring agent.

GEORGE P. HUMFELD.
DONALD AUGUSTUS DE TARTAS.

References Cited in the file of this patent

UNITED STATES PATENTS

| Number | Name | Date |
|---|---|---|
| 2,335,986 | Yngve | Dec. 7, 1943 |